US011563641B1

(12) United States Patent
Lisouski et al.

(10) Patent No.: US 11,563,641 B1
(45) Date of Patent: *Jan. 24, 2023

(54) SHIFTING NETWORK TRAFFIC FROM A NETWORK DEVICE

(71) Applicant: Amazon Technologies, Inc., Seattle, WA (US)

(72) Inventors: Dzianis Lisouski, Dublin (IE); Michal Zygmunt Zawirski, Seattle, WA (US); Robert Kennedy, Seattle, WA (US); Karl Andre McCabe, Dublin (IE); Paul A. Stancik, Seattle, WA (US); Matthew Dean Rehder, Seattle, WA (US); Brian Long, Ashford (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/228,321

(22) Filed: Dec. 20, 2018

Related U.S. Application Data

(63) Continuation of application No. 14/979,356, filed on Dec. 22, 2015, now Pat. No. 10,164,836.

(51) Int. Cl.
*H04L 12/24* (2006.01)
*H04L 41/12* (2022.01)
(Continued)

(52) U.S. Cl.
CPC .......... *H04L 41/12* (2013.01); *H04L 41/0813* (2013.01); *H04L 41/0873* (2013.01); *H04L 43/0876* (2013.01); *H04L 45/123* (2013.01)

(58) Field of Classification Search
CPC . H04L 41/12; H04L 41/0813; H04L 41/0873; H04L 43/0876; H04L 45/123
See application file for complete search history.

(56) References Cited

U.S. PATENT DOCUMENTS 7,277,393 B1 10/2007 Jacobson
7,334,047 B1 2/2008 Pillay-Esnault
(Continued)

FOREIGN PATENT DOCUMENTS

EP 1 638 254 A1 3/2006
JP 2003-218917 A 7/2003
(Continued)

OTHER PUBLICATIONS

International Search Report and Written Opinion for PCT/US2016/067591, dated Mar. 9, 2017, 10 pages.
(Continued)

*Primary Examiner* — Huy D Vu
*Assistant Examiner* — Bailor C Hsu
(74) *Attorney, Agent, or Firm* — Klarquist Sparkman, LLP

(57) ABSTRACT

A traffic shifting system is described to shift traffic away from one or more network devices or interfaces. The system ensures that traffic can be safely shifted off of a network device before the shifting occurs. The method is described as broken into several phases, such as a discovery phase, a pre-check phase, a shifting phase, and a post-shift phase. Before shifting occurs, the discovery phase is used to obtain network topology and configuration information. In the pre-check phase, that information is interrogated so that a shifting can be performed without negatively impacting the network. If the pre-check phase is passed, then the network shifting can occur through adjustment of configuration parameters, such as a cost parameter associated with an interface on any devices for which traffic is being shifted. Finally, in the post-shift phase, checks are performed to ensure traffic is shifting away from the network device.

20 Claims, 9 Drawing Sheets

(51) Int. Cl.
*H04L 43/0876* (2022.01)
*H04L 45/12* (2022.01)
*H04L 41/0873* (2022.01)
*H04L 41/0813* (2022.01)

(56) References Cited

U.S. PATENT DOCUMENTS

| | | | |
|---|---|---|---|
| 7,848,651 B2* | 12/2010 | Hoang | H04L 45/02 |
| | | | 398/57 |
| 8,171,111 B1 | 5/2012 | Niedzielski et al. | |
| 10,887,183 B1* | 1/2021 | Nakagaki | H04L 49/552 |
| 2002/0165944 A1 | 11/2002 | Wisner et al. | |
| 2004/0117251 A1 | 6/2004 | Shand | |
| 2004/0228290 A1 | 11/2004 | Graves | |
| 2006/0002370 A1* | 1/2006 | Rabie | H04L 47/2408 |
| | | | 370/351 |
| 2006/0056411 A1 | 3/2006 | Badat et al. | |
| 2006/0182035 A1 | 8/2006 | Vasseur | |
| 2006/0195607 A1 | 8/2006 | Naseh et al. | |
| 2007/0053300 A1 | 3/2007 | Zhu et al. | |
| 2008/0192651 A1 | 8/2008 | Gibbings | |
| 2010/0034080 A1 | 2/2010 | Charzinski et al. | |
| 2010/0085879 A1* | 4/2010 | Qian | H04L 41/5074 |
| | | | 370/242 |
| 2010/0094986 A1 | 4/2010 | Zuckerman et al. | |
| 2010/0157830 A1 | 6/2010 | Yazaki et al. | |
| 2010/0235431 A1 | 9/2010 | Poluri et al. | |
| 2011/0069613 A1 | 3/2011 | Phillips et al. | |
| 2012/0136999 A1* | 5/2012 | Roitshtein | H04L 49/50 |
| | | | 709/225 |
| 2012/0207175 A1* | 8/2012 | Raman | H04L 47/125 |
| | | | 370/412 |
| 2013/0070638 A1 | 3/2013 | Iovanna et al. | |
| 2013/0250810 A1* | 9/2013 | Ho | H04L 41/12 |
| | | | 370/255 |
| 2013/0339544 A1* | 12/2013 | Mithyantha | H04L 45/02 |
| | | | 709/238 |
| 2014/0010077 A1 | 1/2014 | Busch et al. | |
| 2014/0115135 A1 | 4/2014 | Allan et al. | |
| 2014/0192676 A1* | 7/2014 | Sullivan | H04L 41/12 |
| | | | 370/254 |
| 2014/0211604 A1 | 7/2014 | Sandick et al. | |
| 2014/0355450 A1 | 12/2014 | Bhikkaji et al. | |
| 2015/0092594 A1* | 4/2015 | Zhang | H04L 45/02 |
| | | | 370/254 |
| 2015/0131458 A1* | 5/2015 | Scharf | H04L 45/123 |
| | | | 370/252 |
| 2016/0043954 A1* | 2/2016 | Gopalarathnam | H04L 47/17 |
| | | | 370/235 |
| 2016/0088521 A1* | 3/2016 | Ho | H04W 28/0812 |
| | | | 455/453 |
| 2016/0173199 A1 | 6/2016 | Gupta et al. | |
| 2016/0261500 A1* | 9/2016 | Revah | H04L 45/7453 |
| 2016/0359879 A1* | 12/2016 | Deen | G06F 16/248 |
| 2017/0099210 A1* | 4/2017 | Fardid | H04L 43/08 |
| 2017/0155706 A1* | 6/2017 | Hiltunen | H04L 41/12 |
| 2017/0289117 A1* | 10/2017 | Powers | H04L 41/00 |

FOREIGN PATENT DOCUMENTS

| | | |
|---|---|---|
| JP | 2005-175659 A | 6/2005 |
| JP | .2010-041385 A | 2/2010 |
| JP | 2010-148023 A | 7/2010 |

OTHER PUBLICATIONS

Communication pursuant to Article 94(3) EPC for European Patent Application No. 16 823 130.6, dated Jul. 19, 2019, 3 pages.
Office action (w/ English translation) for Chinese Patent Application No. 201680076010.0, dated May 7, 2020, 13 pages.
First Office action (with English translation) for Japanese Patent Application No. 2018-532145, dated Jun. 21, 2019, 15 pages.
Final Office action (with English translation) for Japanese Patent Application No. 2018-532145, dated Sep. 14, 2020, 4 pages.

* cited by examiner

SHIFTING NETWORK TRAFFIC FROM A NETWORK DEVICE

CROSS-REFERENCE TO RELATED APPLICATION

This is a continuation of U.S. application Ser. No. 14/979,356, filed Dec. 22, 2015 (now U.S. Pat. No. 10,164,836). Said application is incorporated by reference herein in its entirety.

BACKGROUND

Traffic on the Internet has grown dramatically over the last decade and continues to grow. Routers play a critical role in sustaining that growth. Various protocols exist for routers to communicate together. Typically, the protocols allow routers to identify neighbors and costs associated with routing packets to those neighbors. Such information allows the routers to construct a topology map and to select an optimal route for forwarding network packets. Open Shortest Path First (OSPF) is an example of a routing protocol for Internet Protocol networks.

In some cases, for maintenance or other reasons, it is necessary to shift traffic away from a router or a group of routers. Such traffic shifting is often manually accomplished with no set techniques established. More efficient traffic shift options are needed.

DETAILED DESCRIPTION

The embodiments described herein relate to shifting traffic away from one or more network devices. In some instances, it is desirable to remove one or more network devices (e.g., routers, switches, bridges, hubs, etc.) from a network for the purposes of maintenance, updates, replacements, etc. Generally, modifying routing configuration information (e.g., increasing a cost parameter or changing routing policy information) of a network device makes it appear as an unattractive alternative to other network devices. However, adjusting the routing configuration information alone without further checks can cause dramatic network problems. For example, if the network does not have sufficient resources to withstand losing the network device, then adjusting the cost parameter could be detrimental to the overall network functionality.

Consequently, the system ensures that traffic can be safely shifted off of a network device before the shifting occurs. The method is described as broken into several phases for simplicity, such as a discovery phase, a pre-check phase, a shifting phase, and a post-shift phase. Other phases can be added, such as an identification phase, or phases can be eliminated, such as the post-shift phase or the discovery phase. Alternatively, some of the phases described herein can be merged. Before shifting occurs, the discovery phase is used to obtain network topology and configuration information. In the pre-check phase, that information is interrogated to ensure that a shifting can be performed without negatively impacting the network. If the pre-check phase is passed, then the network shifting can occur through adjustment of routing configuration information associated with an interface on any devices for which traffic is being shifted. Finally, in the post-shift phase, checks are performed to ensure traffic is shifting away from the network device.

Figure 1:
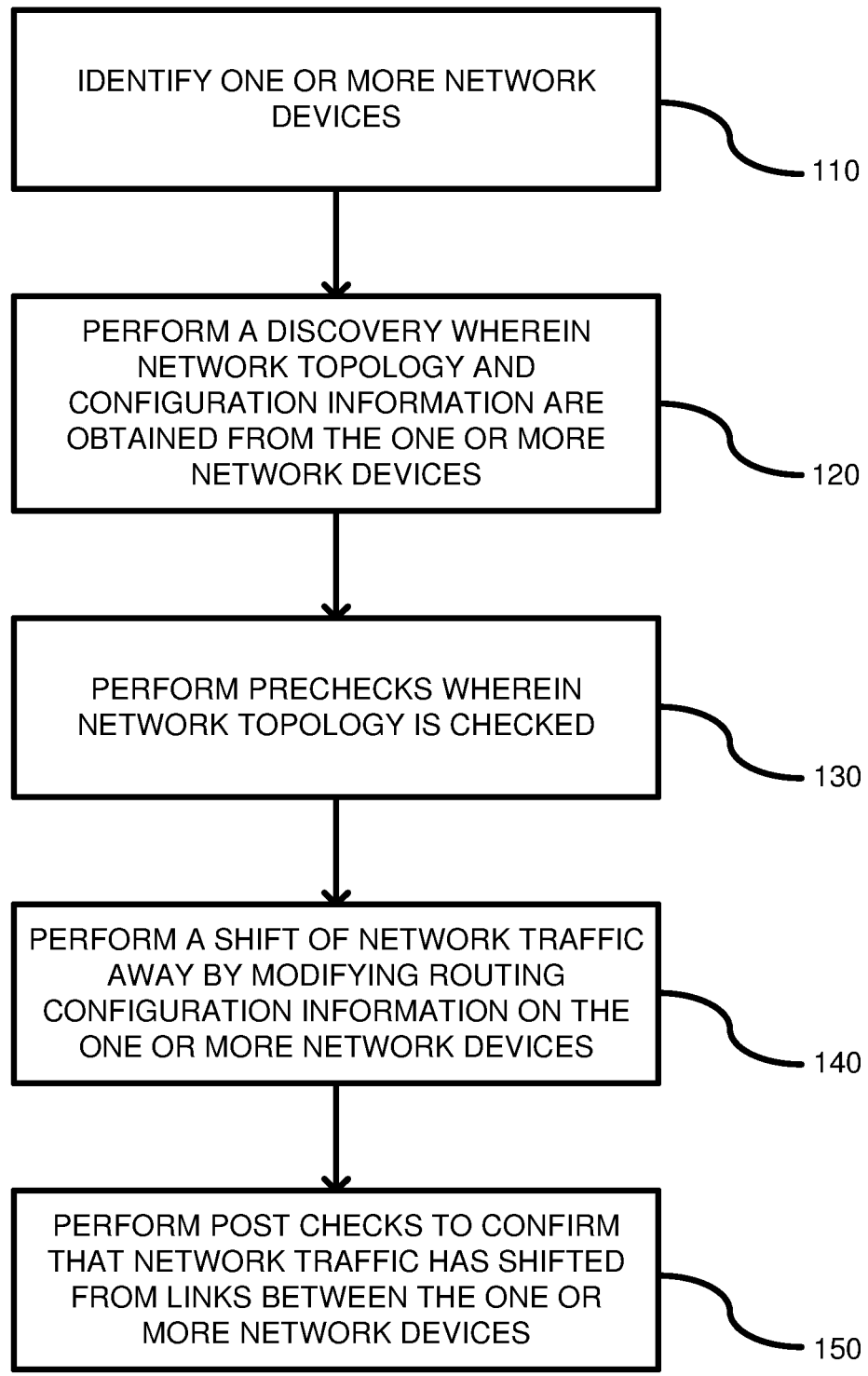
FIG. 1 is a flowchart of a method for shifting traffic away from one or more network devices in a network.

FIG. 1 shows each of the phases in turn. The process blocks of FIG. 1 can be executed by a server computer, such as a server computer within a service provider environment (e.g., a cloud environment). Process block 110 shows the identification phase, wherein one or more network devices are identified. In the case of a single network device, a single identification, such as a globally unique identifier (GUID) or an address can be used. In the case of a plurality of network devices, multiple identifiers can be used. The identifiers can be passed to a service performing the traffic shifting in the form of a text file, an API, or other means. Alternatively, a request can be made to the service that identifies two or more end points. For example, two data centers can be identified and a request made to remove all network interfaces used to establish links that are coupled between the two data centers. In such a case, the network devices associated with those data centers needs to be determined. There are multiple techniques for obtaining such information. For example, a list (e.g., an electronic text file) can be provided to the service, wherein the list includes all of the relevant network devices that are connected between the two end points. Alternatively, the service can request, from the service provider, a list of network devices associated with the end points. In any event, at the end of the identification phase, a list of one or more network devices is obtained.

In process block 120, a discovery phase is performed wherein local topology information and/or configuration information are obtained for one or more network devices. For example, the service can query each identified device for topology information or configuration information. Alternatively, the service can obtain such information from other services in the service provider. The topology information can include identifiers of neighbor network devices, neighboring router characteristics, network protocols being used, network devices joined by a segment, border router information, etc. Additional topology information can include active network interfaces (e.g., port channels being used) on each device, network protocols being used on those port channels, etc. Configuration information can include any stored parameters relating to how the network device is configured. For an Open Shortest Path First (OSPF) protocol, for example, configuration parameters can relate to cost, retransmit intervals, transmit delays, authentication, etc. The cost parameter allows other network devices to judge a network path's feasibility. For example, routers typically determine multiple candidate routes to a destination. Cost parameters stored in a router's configuration allow neighbor routers to determine which route is optimal. In other protocols, such as the Border Gateway Protocol (BGP), routing configuration can include weight parameters, local preference parameters, Autonomous System (AS) path parameters, etc. During the discovery phase, some identified devices can be removed from the list of devices for which traffic is to be shifted. For example, if neighbor information does not coincide between two connected devices, then one or more of these devices or interfaces on those devices can be removed from the list. In some cases, the discovery phase can be bypassed altogether, and the pre-check phase can be initiated after a network device has been identified.

In process block 130, pre-checks are performed to detect any possible error conditions. For example, information obtained during the discovery phase can be used to detect error conditions. A wide variety of pre-checks can be performed. For example, network topology information can be checked to ensure it is consistent across devices. The network topology information can include cross-checking network interfaces to determine if they each identify the other as neighbors. For example, if a network interface 1 on a router A identifies a network interface 2 on router B, then a check is determined to ensure that network interface 2 also identifies network interface 1 as a neighbor. If there is a match, then the pre-check is considered as passing, whereas if it fails, then the traffic shifting can be rolled back so that it does not occur.

In such a situation, an error message can be transmitted to a customer so that a technician can investigate the error. Where two end points are identified, a further network topology check can be performed by comparing a number of network interfaces at one end point to a number of network interfaces at the other end point. The number of interfaces at each end point should match.

Another pre-check is to ensure that all of the cost parameters are consistent across the routers being shifted. For example, the OSPF protocol has a load balancing option called Equal Cost Multi Path (ECMP) wherein all routers have an equal cost parameter. Thus, the cost parameters of all the devices can be cross-checked to ensure that they are equal, and, if not, an error condition can be generated. Other pre-checks include checking a blacklist that can identify different network devices or different end points that are not to be taken off of the network. Such a blacklist can be provided by a customer or an administrator and can be accessible to the traffic shifting service. In still another pre-check, a capacity of the network can be checked to ensure that if the network device or set of network devices are removed from the network that the network can still operate. For example, if the routers are determined to be critical to the sustainability of the network, then the traffic shifting can be terminated. As such, an error condition can be initiated indicating that the remaining network devices after the traffic shifting have insufficient bandwidth to sustain current network traffic. In still another pre-check, a determination is made whether all the port channels are a same size (i.e., a same number of interfaces) and that the port channels are in the same operating state. For load balancing purposes, it is desirable that the network devices are operating in a similar way to have traffic shifted off of some of the devices. Not all of the pre-checks require information obtained from the network device itself. For example, checking network capacity can be performed without any information from a network device being removed from the network. As a result, some of the pre-checks can be performed without the discovery phase. However, the discovery phase does provide a more robust list of options.

In process block 140, assuming all of the pre-checks have passed, the shifting of network traffic can be performed. For example, network traffic can be shifted away from links coupled between data centers. From the discovery and pre-check phases, a final list of network devices, network interfaces, or links can be used for which network traffic is to be shifted. To shift network traffic, the network device or the set of network devices can have their routing configurations changed (such as on a network-interface basis) so as to ensure a high cost parameter (e.g., a maximum value) is associated with the network device or a policy changed. In either case, the network interface appears to neighbors as an undesirable option to route packets. In one example, a server computer can generate parallel processes, one for each network device, so that all of the network devices can be written in parallel (at substantially the same time) for modifying the configuration information. For example, if there are 20 routers at one end point, then a server computer can initiate 20 processes executing in parallel for writing cost configuration information to the routers in parallel and at substantially the same time. In another example wherein a single network device is being removed, all of the interfaces on that network device can have the routing configuration information (e.g., cost or policy parameters) changed. Continuing with the example, by writing the configuration information to the 20 routers at the same time, network traffic does not start to shift to any of the other 20 routers before their configuration information is changed. Once the costs parameters or policy parameters are written, they can be checked by reading the cost parameters or policy parameters back out of the devices and cross-checking that the expected value is read back. If any of the cost parameters or policy parameters are not equal to the values that were written, then an error condition can be generated wherein an administrator or customer is alerted. In some cases, where there are two end points, then each end point can be written in turn, so that a first end point is re-configured prior to a second end point.

In process block 150, a post check can be performed to confirm that the network traffic has been shifted from the one or more network devices. The traffic need not immediately go to zero. Rather, there can be a gradual shifting of the traffic as the new cost parameter is propagated to the neighbor devices. The post check can include checking at multiple predetermined time intervals to ensure that a quantity of traffic is meeting desired reduction thresholds. In one example, checks can be made every 30 seconds until the traffic volume has gone below a threshold level, such as zero or near zero. In another example, protocol status information can be checked to ensure that the routing configuration information has been updated. For example, cost parameters can be checked to ensure what is read back matches what was written.

Although the above embodiment is described using the OSPF routing protocol, other routing protocols can be used. For example, any interior gateway protocols (IGP) or exterior gateway protocols can be used (e.g., the BGP). Other example protocols include OSPF, Routing Information Protocol (RIP), Intermediate System to Intermediate System (IS-IS), Label Distribution Protocol (LDP), and Resource Reservation Protocol (RSVP). The network devices most typically include a router. A router, as described herein, includes hardware and software that communicatively interconnects other equipment on the network (e.g., other network elements, end stations). Some routers provide support for multiple networking functions (e.g., routing, bridging, switching, Layer 2 aggregation, session border control, etc.), and/or provide support for multiple application services (e.g., data, voice, and video). Routers typically include a control plane and a data plane (sometimes referred to as a forwarding plane). The control plane determines how data (e.g., packets) are routed (e.g., the next hop for the data and the outgoing port for that data), and the data plane forwards the data. The control plane can include one or more routing protocols that communicate with other routers to exchange routes and select those routes based on one or more routing metrics.

Routers implementing OSPF run a link state routing protocol that maintains an identical link state database (LSDB) describing the topology of the autonomous system (AS) in which it resides. Each record in the LSDB lists a particular network element's usable interfaces and reachable neighbors, adjacencies, or routes external to an area or AS. Neighboring routers are two routers that have interfaces to a common network, wherein an interface is a connection between a router and one of its attached networks. Moreover, an adjacency is a relationship formed between selected neighboring routers for the purpose of exchanging routing information and abstracting the network topology. One or more router adjacencies can be established over an interface. The adjacencies are established and maintained in OSPF through the use of a "Hello" protocol. The Hello protocol ensures that communication between neighbors is bi-directional by periodically sending Hello packets out of all of the network element interfaces. Bi-directional communication is indicated when the router sees itself listed in the neighbor's Hello packet.

Figure 2:
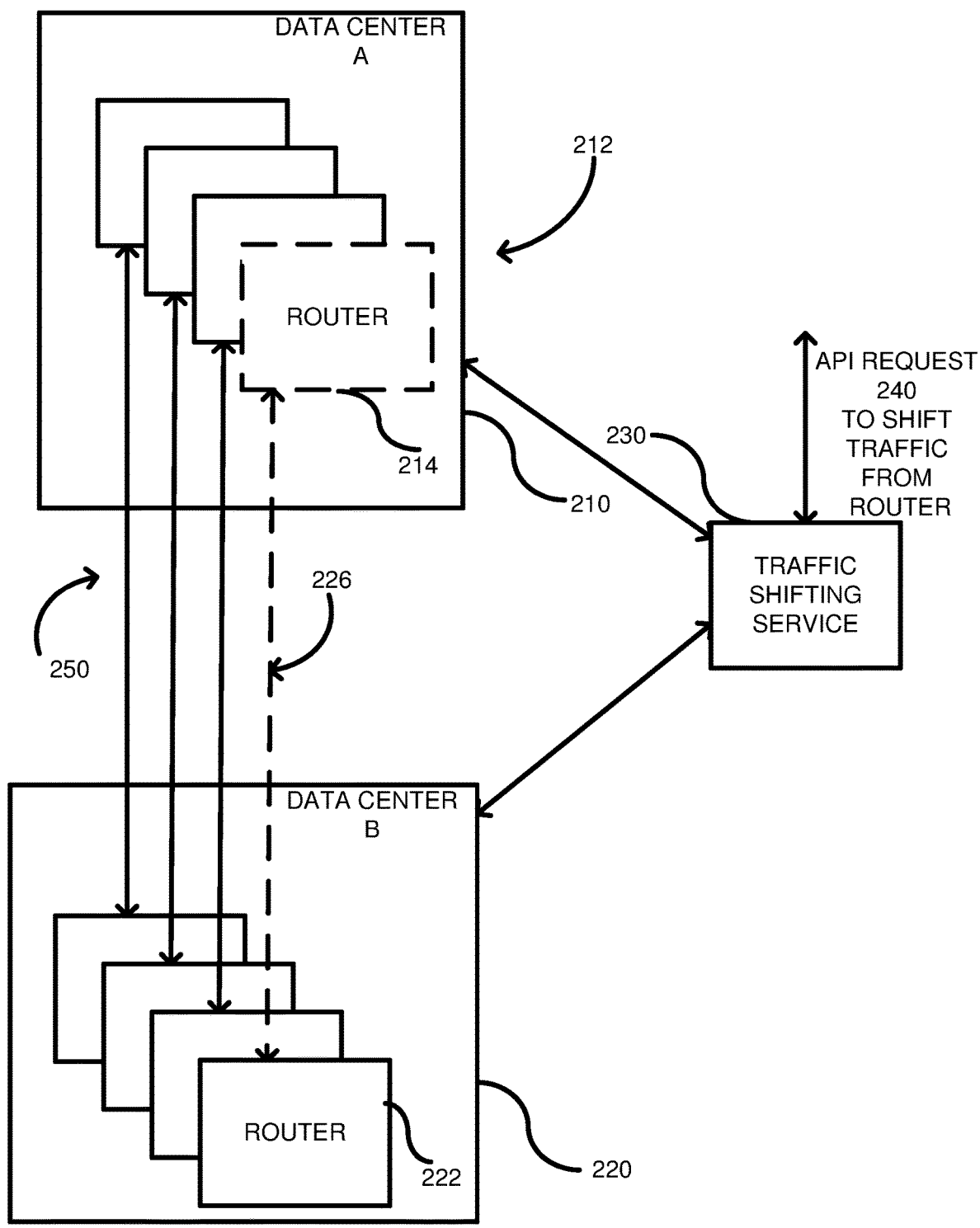
FIG. 2 shows a router network with multiple routers divided into different areas, wherein traffic is shifted away from one of the routers.

FIG. 2 shows an example wherein a single network device (in this case a router) is removed (for purposes of routing traffic) from a network through traffic shifting. In this example, a data center A, shown at 210, includes a plurality of routers shown at 212. A particular router of interest is a router 214, which is shown in dashed lines to indicate that it will be removed from the network. A data center B, shown at 220, also includes a plurality of routers, including a router 222 coupled via a link 226 to router 214. The link can include a physical cable (e.g., fiber optic) and any supporting software needed to establish a communication channel. In this case, removal of the router 214 removes all of the interfaces within the router 214 from the network, including a network interface supporting the link 226. A traffic shifting service 230 receives an Application Programming Interface (API) request 240 asking to remove router 214 from the network. In this example, once router 214 is removed, network traffic can still flow freely on other links, shown at 250, coupling the data centers 210, 220 together. However, a check can be made to determine if the links 250 have sufficient bandwidth to handle the network traffic once router 214 is removed.

For removal, router 214 can be identified as a router to be removed using an identifier of the router (e.g., an address) in the API request 240. Then, the router 214 can be queried for network topology information, such as by the host server computer 230, which can be performing the traffic shifting. The router 214 is shown having an interface open and coupled to router 222. This information can be cross-checked to ensure that router 222 has network topology information indicating that it is coupled to router 214. Other pre-checks can be performed as already described above, such as that all of the routers have similar cost parameters, have similar number of interfaces, etc.

Once the pre-checks have passed, then host server computer 230 can write new routing configuration information, such as a cost parameter (e.g., a maximum allowed cost parameter) or policy parameters to router 214. The other routers will then discontinue using router 214 and it can be safely removed from the network.

Figure 3:
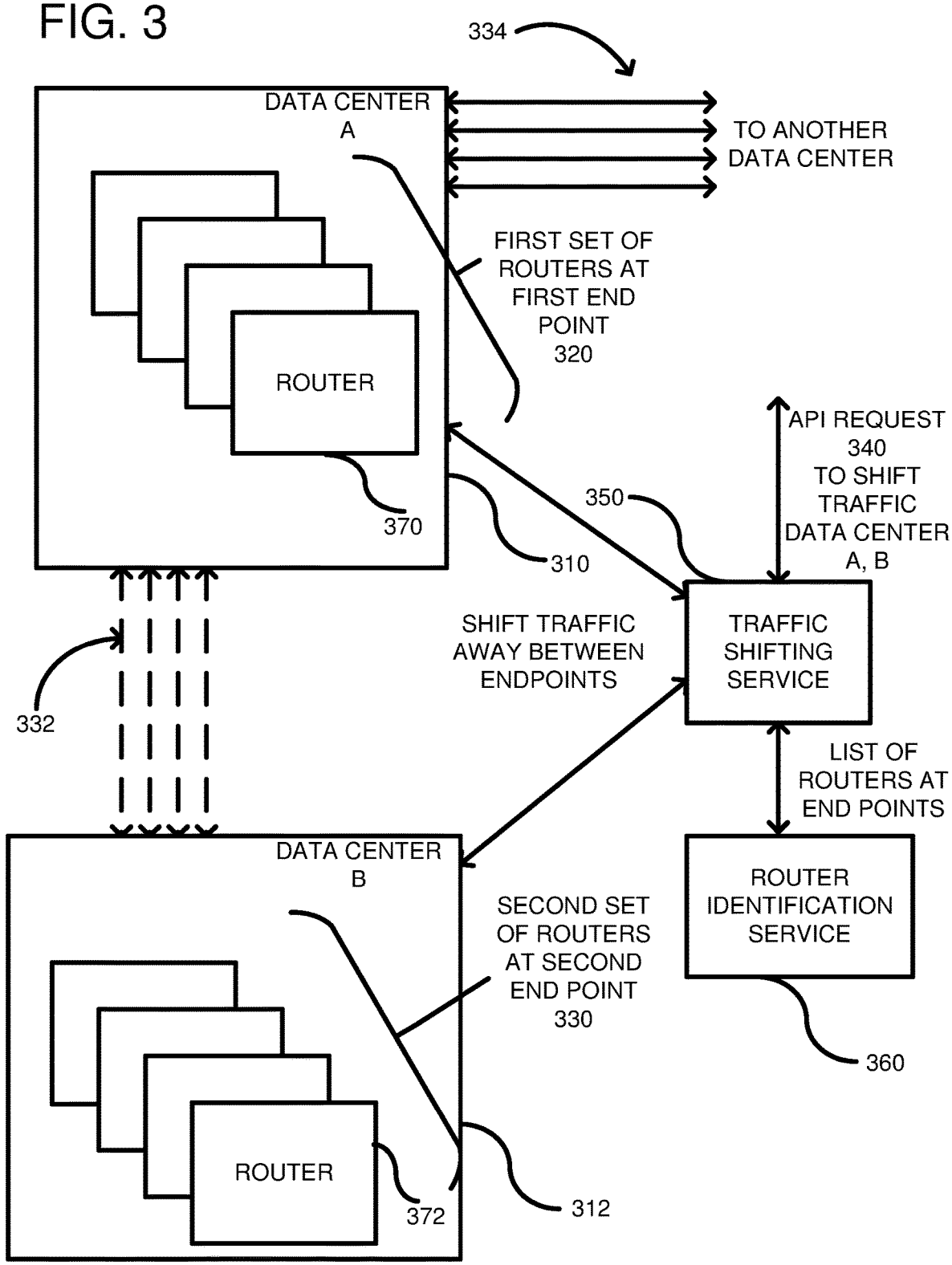
FIG. 3 shows multiple data centers with sets of routers communicating between the data centers, wherein traffic is shifted away from the sets of routers.

FIG. 3 shows an example wherein traffic shifting applies to two end points, such as between two data centers 310, 312. Each data center can include a set of one or more routers. For example, a first set of routers are shown at 320, while a second set of routers are shown at 330, with links 332 coupling the two together. The links 332 can include dedicated cables or optical fiber and are shown in dashed lines to indicate traffic will be shifted away from these links. The routers 320 are shown with other interfaces used to establish links 334 coupling the data center 310 to other data centers. An API request 340 can be made to a traffic-shifting service 350 wherein the two end points are identified. The identification can be a number, city, or any other desired identification. Prior to the discovery phase, the traffic shifting service 350 can make an API request using the endpoints to a router identification service 360, which transmits a list of the routers at the endpoints. Alternatively, the list of routers can be passed to the traffic shifting service in other ways, such as receiving a list directly from a customer. The list can include addresses or other identifiers for the service. The traffic-shifting service 350 can communicate with the data centers 310, 320 to obtain router topology or configuration information, as already described, for the routers in the list. During the discovery phase, the traffic shifting service 350 can identify the particular interfaces on the routers 320 that are used to establish the links 332. Additionally, during the discovery phase, the traffic shifting service 350 checks neighbor information and network interfaces to ensure that both are consistent between the endpoints. For example, a router 370 at endpoint 310 should have a network interface identified as coupled to router 372. Likewise, router 372 should have a network interface identified as coupled to router 370. Such cross-checking of network topology information for consistency assists in ensuring that traffic will be safely shifted before the shifting occurs. Once such pre-checks (which includes any of the pre-checks discussed in FIG. 1) are completed, the traffic shifting can occur by the traffic shifting service 350 by writing routing configuration information (e.g., a cost parameter, policy information, etc.) to the routers 320 in parallel processes so that the routers 320 are written at substantially the same time. The routing configuration information should be modified such that neighbor routers will want to choose alternative paths. For example, the cost parameter should be sufficiently high that neighbor routers will choose alternative paths. Once the routing configuration information is written to the routers in the Data Center A, the traffic shifting service 350 writes routing configuration information to the routers in Data Center B in parallel so that they are written at substantially a same time. Post checks can then be performed by the traffic shifting service 350 to ensure that traffic is shifted. The routers, such as routers 320, can have only the interfaces removed that support the links 332, while other interfaces remain operative, such as interfaces supporting links 334.

Figure 4:
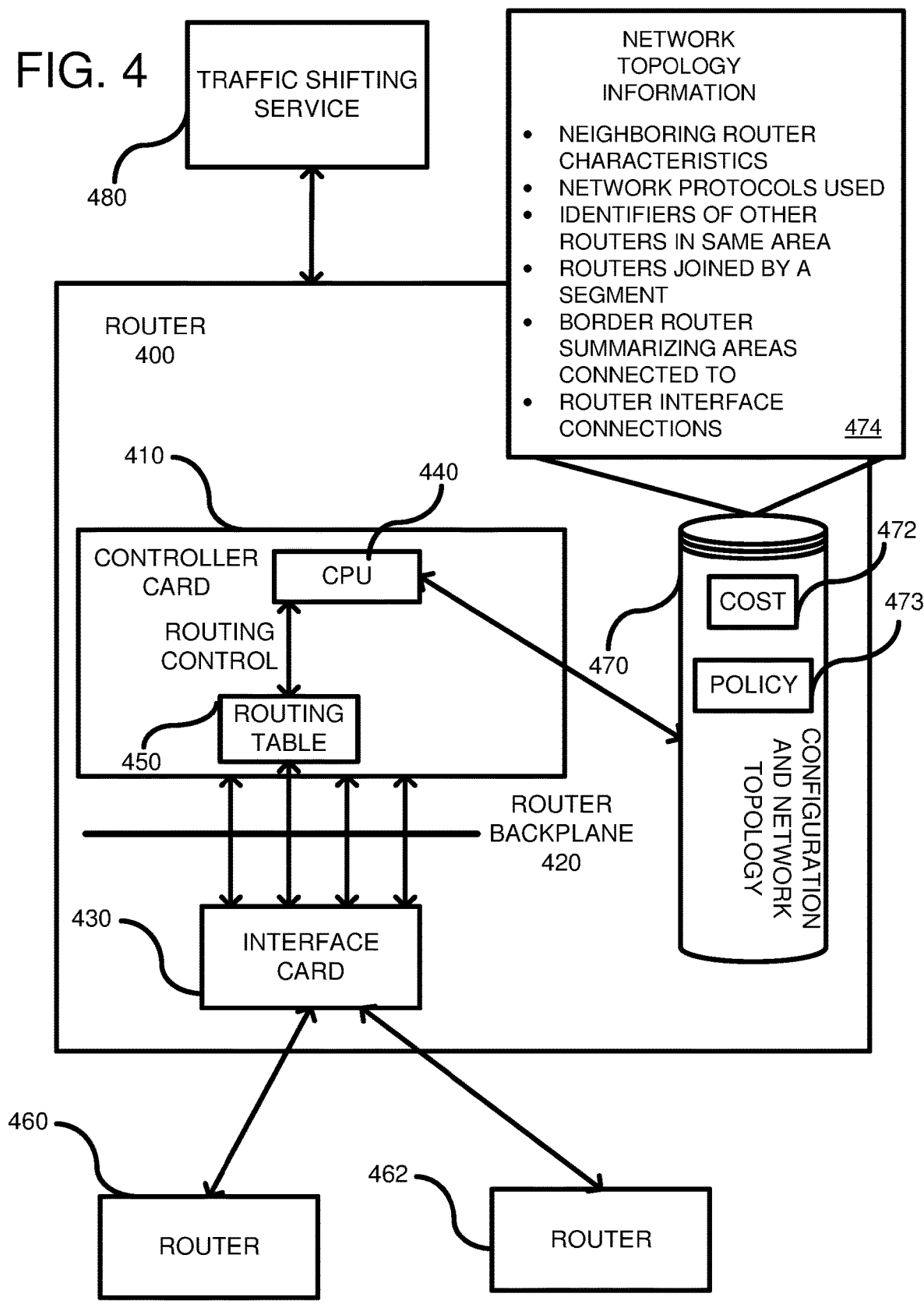
FIG. 4 shows an embodiment of a router architecture with configuration and network topology storage.

FIG. 4 shows further details of a router architecture. A router 400 includes a controller, such as a controller card 410, a router backplane 420 and one or more interfaces, such as interface cards 430. A CPU 440 is positioned on the controller card 410 and typically performs functions such as router table maintenance, path computations, and reachability propagation. The interface cards 430 include adapters for performing inbound and outbound packet forwarding. The router backplane 420 is responsible for transferring packets between the controller card and the interface cards. The basic functionality of the router 400 can include route processing and packet forwarding. A routing table 450 allows the router to create a view of the network's topology, which describes router relationships in a network, etc. For example, the router 400 is coupled to a network of other routers, such as is shown at 460, 462 (many other routers are generally included but not shown for simplicity).

Packet forwarding generally includes IP packet validation wherein the router checks that the packet is properly formed before processing the packet. The router can then perform a table lookup to determine an output port onto which to direct the packet, and a next destination to which to send the packet. The router can also adjust a time-to-live parameter to prevent circulation of packets that are too old. Finally, the router can perform an IP header checksum.

Router table lookup in the router table 450 is typically performed by the CPU 440 using the packet's IP destination address as a key. The lookup returns the best-matching routing table entry, which provides the interface and the IP address of the packet's next hop. The next hop address can be cached in a front-end routing table (not shown), which can be organized as a hash table.

The controller card 410 can also include storage (e.g., memory, hard drive, etc.) for a router configuration and network topology 470. The router configuration is independent of the routing table 450 and does not identify best routes to take through a router network. Thus, the router configuration is independent of the routing topology information. Instead, the router configuration can relate to interface settings or other characteristics or properties of the router (also called environmental parameters). Example configuration settings include speed (e.g., 10 megabits per second, 100 megabits per second, Auto mode, etc.), maximum transmission units (MTU) (maximum packet size), transmission modes (e.g., full duplex, half duplex, etc.), encapsulation types, interface types, load interval (the length of time used to calculate the average load on an interface), redirect message settings (if forced to resend a packet), setting up neighbors, adjacency, configuration of routing protocols, etc. A particular configuration of interest is a cost parameter 472. The cost parameter can be, for example, an OSPF cost that is then shared with neighbor routers to indicate the capacity of the router 400. Another configuration can be policy information, such as shown at 473. The policy information can include one or more parameters, such as routing-based policy information that impacts how neighbor devices route traffic. An example policy parameter can be associated with an external BGP peer or peer group. Modifying such BGP-based parameters can impact routing decisions.

The router topology information stored in the storage 470 is shown at 474 and can be separately received and can include information about the router network environment of which the router 400 is a part. The network topology information can include identifiers of other routers in the same area, routers currently joined by a segment (adjacency), border routers summarizing areas connected to, router interface information, etc. The network topology information can be a link-state database (LSDB) in some protocols, such as the OSPF protocol. In an example embodiment, the network topology information 474 may also include neighboring router characteristics and network protocol information. The neighboring router characteristics may provide information on one or more routers that are communicatively coupled to the router 400, such as hardware characteristics, type of router, ports used for outgoing or incoming communications, and so forth. The network protocols information may indicate the network communication protocol (or type of network traffic, such as Level 2, Level 3, etc.) used by the router 400 and/or any other router(s) communicatively coupled to router 400.

As previously described, a traffic shifting service 480 can read the topology information 474 and any of the configuration information stored in storage 470. The service 480 can further modify the cost parameter 472 or the policy information 473 so that other routers, such as routers 460, 462 redirect traffic through other paths.

Figure 5:
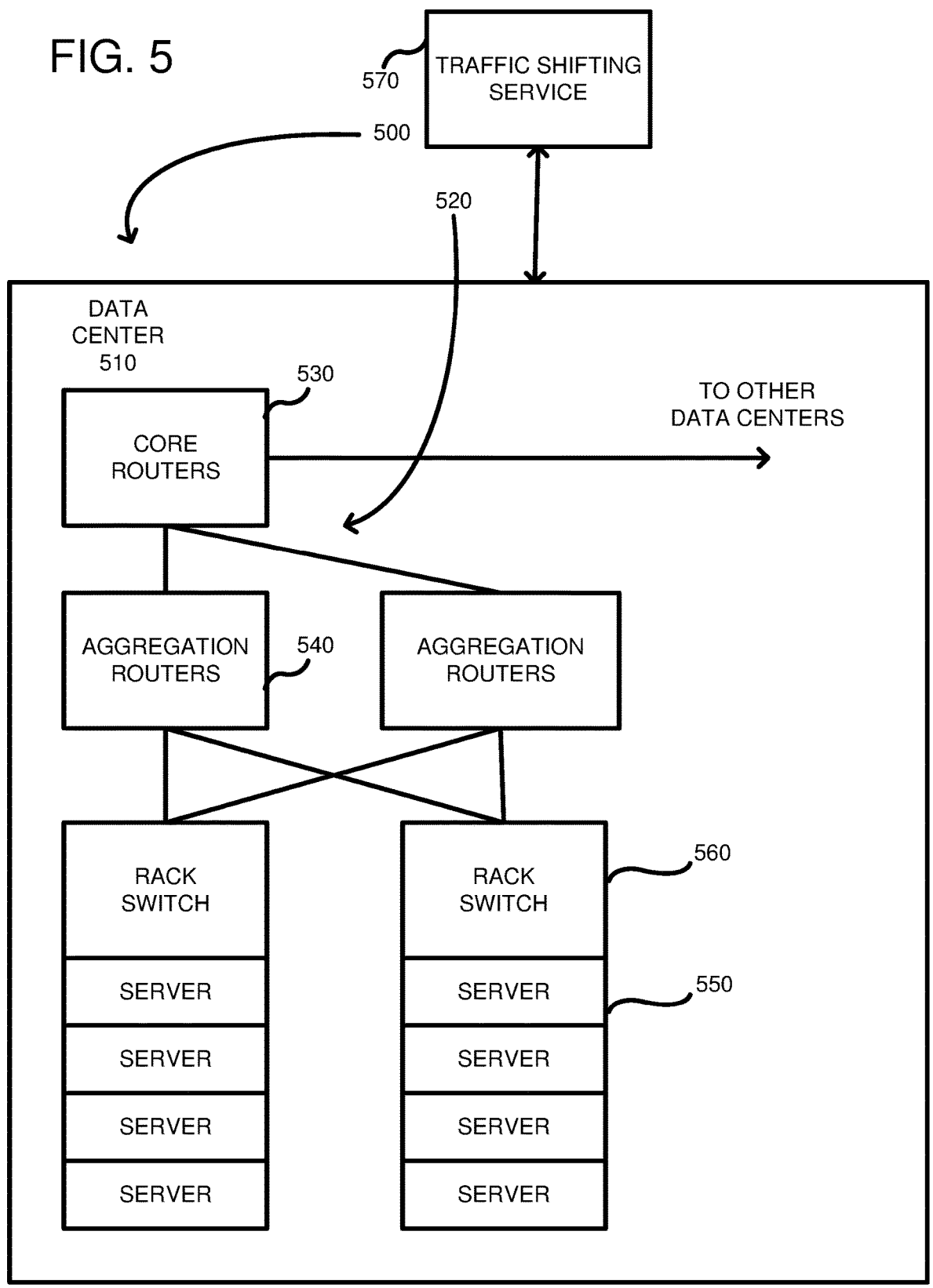
FIG. 5 shows an example of a plurality of routers in a data center, wherein the routers can have traffic shifted by a traffic shifting service.

FIG. 5 illustrates an environment 500 in which the network of routers can be used. In this example, the environment 500 includes a plurality of data centers including data center 510 coupled together by routers, shown generally at 520. Different levels of routers can be used. For example, core routers 530 can be coupled to other core routers in other data centers within a service provider environment. The routers 530 read address information in a received packet and determine the packet's destination. If the router decides that a different data center contains a host server computer, then the packet is forwarded to that data center. If the packet is addressed to a host in the data center 510, then it is passed to a network address translator (NAT) (not shown) that converts the packet's public IP address to a private IP address. The NAT also translates private addresses to public addresses that are bound outside of the datacenter 510. Additional aggregation routers 540 can be coupled to the NAT to route packets to one or more racks of host server computers 550. Each rack 550 can include a top-of-rack (TOR) switch 560 coupled to the multiple host server computers. Although one core router 530 and two aggregation routers 540 are shown, in a real data center there can be many more routers, and the routers can be grouped into areas as described herein. A traffic shifting service 570 can be coupled to the data center 510 to communicate with any of the routers or switches within the data center. Thus, any of the routers or switches can be coupled to other data centers and can have traffic shifted using the traffic shifting service 570.

Figure 6:
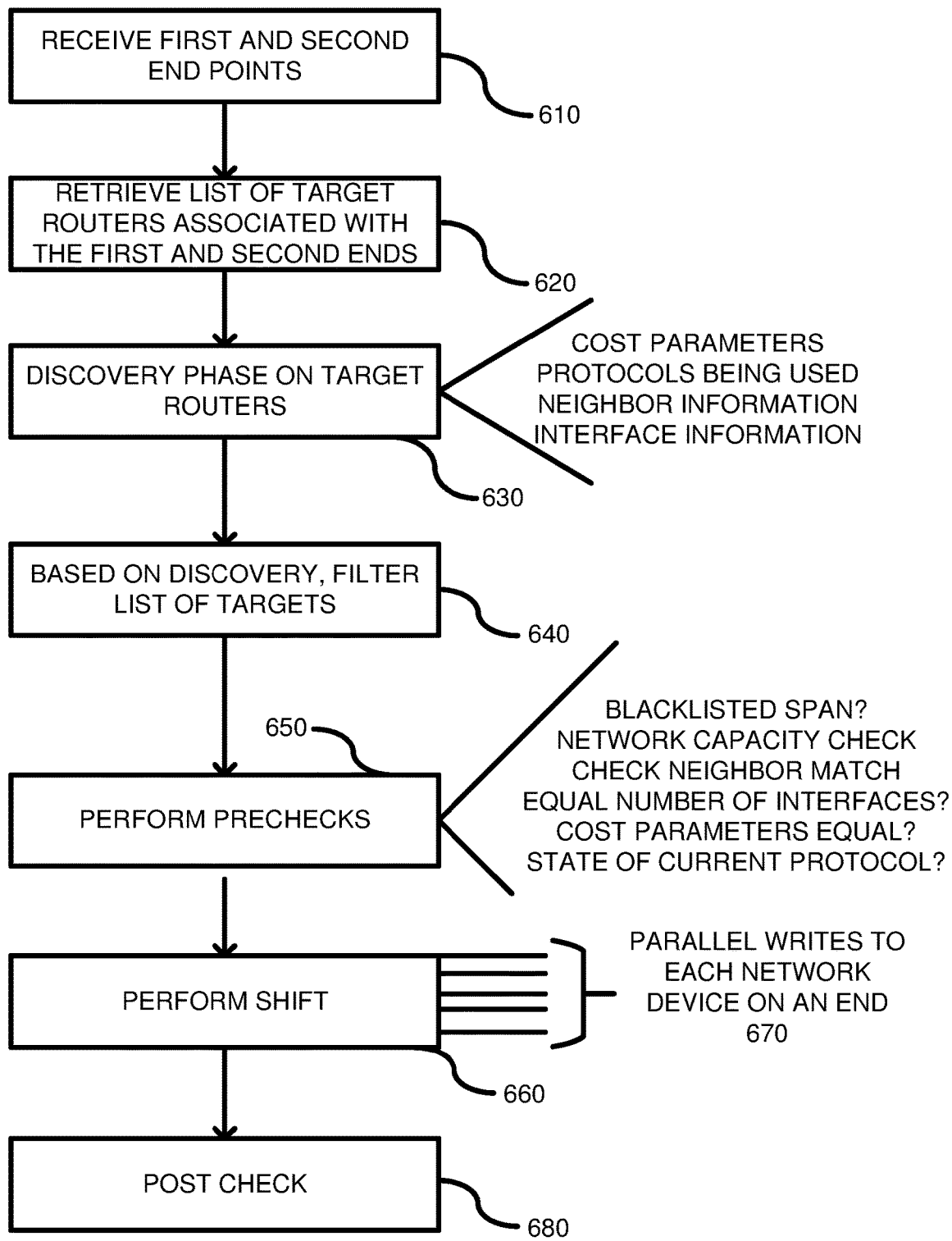
FIG. 6 shows a detailed flowchart according to one embodiment for shifting traffic away from a plurality of network devices.

FIG. 6 is a flowchart of a method for shifting traffic in network devices wherein at least two end points are provided. In process block 610, identification information is received for first and second end points. The endpoints can be datacenters or individual network devices. However, by having two endpoints, there are at least two network devices, with one network device at each end point. The request can be an API request to a traffic shifting service. In process block 620, a list of target routers (or other network devices) associated with the first and second end points can be retrieved. The list can be provided by a service of a service provider that maintains such a list. Alternatively, the list can be provided with the original request to the traffic shifting service. There are multiple techniques that can be used by a traffic shifting service in order to obtain address information for routers at the first and second end points and any such technique can be used.

In process block 630, a discovery phase is initiated on the target routers. The discovery phase can include the target shifting service querying the identified routers for configuration information and network topology information. Example information can include cost parameters, policy parameters, protocols being used, neighbor information, interface information, etc. For example, the interface information can be used to determine links connecting the end points together for purposes of transmitting network traffic. Thus, during the discovery phase, the target shifting service can interrogate the routers to retrieve stored status and data information therefrom. In process block 640, based on the discovery phase, the target shifting service can filter some of the list of target routers so as to reduce the list. For example, any of the target routers that do not pass predetermined checks can be removed from the set of routers for which traffic shifting will occur. In process block 650, pre-checks can be performed using the discovery information. Example pre-checks can include checking whether a network span between the endpoints is on a blacklist, such that it is not movable. A network span is at least one dedicated path (e.g., a fiber optic cable) between interfaces on network devices. The span can be between data centers or within a data center. In one example, both end points can be checked against a stored list and if the endpoints match the span on the list, then an error condition can be initiated. Other pre-checks include a network capacity check wherein the target shifting service checks whether the network can maintain its current bandwidth without the network span. Still further, network-interface based information can be checked. For example, the target shifting service can cross-check neighbor network interfaces to ensure that they are consistent (not conflicting). Yet still further, the target shifting service can check whether a number of interfaces is equal on each of the first and second ends for the span between those ends. A further check can be based on current configuration parameters, such as a determination whether the cost parameters are equal.

After the pre-check, a final list of routers is obtained for which traffic shifting occurs. In process block 660, traffic shifting occurs. As indicated at 670, parallel writes can be used to write cost configuration information to each network device at approximately a same time. Alternatively, writes can occur in other desired sequences, such as in series, or a combination of some of the devices in parallel and some in series. Parallel writing of devices ensures that the entire network span slows at a similar period of time. In process block 680, a post check is performed wherein the traffic shift service can query the network devices to ensure that traffic is indeed slowing down. A volume of traffic can be compared to predetermined levels and if the traffic volumes still continue, then an error message can be transmitted. Otherwise, the network device can be safely removed from the network.

Figure 7:
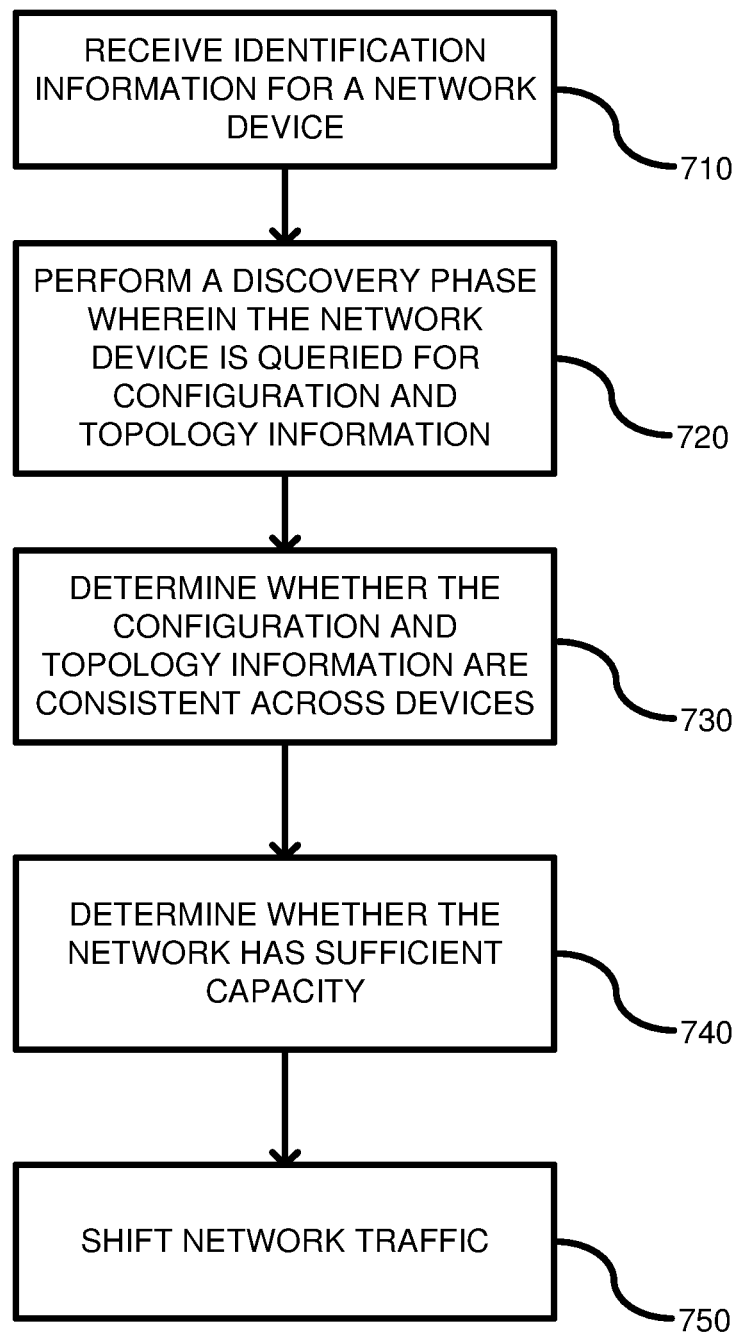
FIG. 7 shows a flowchart according to another embodiment for shifting traffic away from a plurality of network devices.

FIG. 7 is a flowchart according to another embodiment for traffic shifting. In process block 710, identification information can be received for a network device to be removed from a network. As described above, the network device can be a router, switch, bridge, hub, etc. The identification information can be an address or an identifier, such as a GUID. The identification information can be received in a traffic shifting service, which can execute on one or more server computers. In process block 720, a discovery phase is performed wherein the identified network device is queried for configuration information and network topology information. The configuration information and network topology information are typically stored information on each network device. However, the configuration and network topology information can also be determined from querying other services. In process block 730, a determination is made whether the configuration information and the network topology information are consistent. Thus, a check is made whether neighbor devices have information that is the same (or does not conflict) with the information obtained on the network device being removed. In one example, the cost parameters should be the same across all devices and if the cost is not the same, an error condition exists. In another example, the network topology information is cross-checked to see if each device cites a corresponding device as a neighbor, as opposed to one device identifying a device as a neighbor, whereas the neighbor device does not. In process block 740, a determination can be made whether there is sufficient network capacity to remove the device from the network. Such a determination can include a capacity check for neighbors of the network device. In process block 750, network traffic is shifted from the network device. Such a shifting occurs through increasing a cost parameter on each interface in the device. Other techniques can be used for shifting the network traffic, such as changing any of the policy information that impacts routing decisions. The shifting of network traffic can be for the entire network device (all interfaces) so that the network device can be physically removed from the network.

Figure 8:
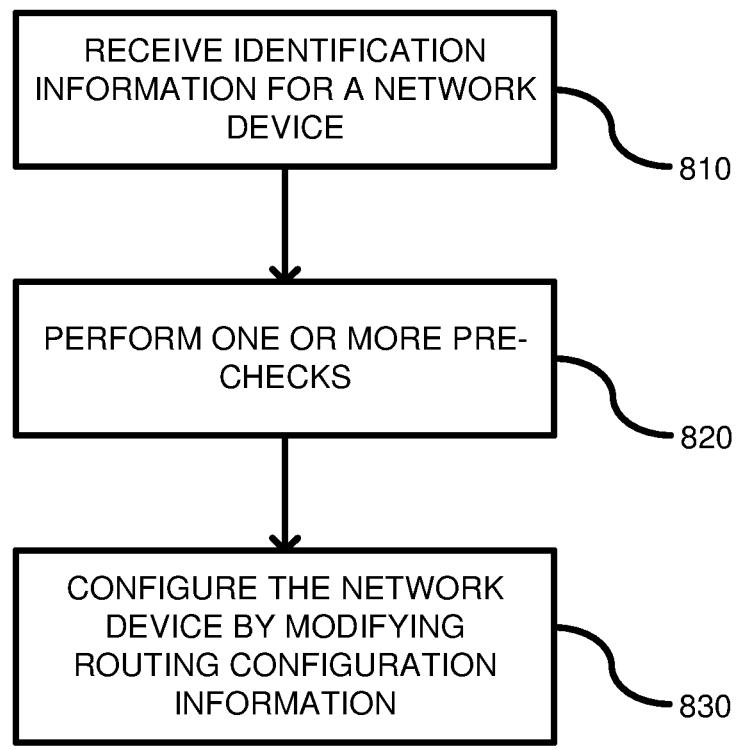
FIG. 8 shows a flowchart according to yet another embodiment for shifting traffic away from a plurality of network devices.

FIG. 8 shows a flowchart of a method according to another embodiment for shifting network traffic. In process block 810, identification information is received for the network device that is to have traffic shifted away from it. The identification information can be made in a variety of forms, such as a GUID or an address. In process block 820, one or more pre-checks can be made. Such pre-checks can be made based on information obtained from the network device itself, or the pre-checks can be made based on information obtained independent of information stored on the network device. Consequently, the pre-checks do not require a discovery phase to occur. The pre-checks are generally chosen so as to ensure that the network device can be safely removed from the network. In one example, a pre-check can include determining that network traffic can be routed through other network devices on the network and that such network devices have sufficient capacity for handling the increase in network traffic once the network device is removed. Other pre-checks can include checking whether the network device is on a blacklist of devices that should not be removed. Still further, if a discovery phase is performed, then configuration parameters, such as a cost parameter, can be checked against neighbor devices to ensure that it is consistent across devices. If any errors occur during the pre-check phase, then an error condition can be generated and the shifting of the network traffic can be terminated. In process block 830, the network device can be configured so that routing configuration parameters are modified to make routing packets to the network device undesirable. In one example, the cost parameter is modified and the cost parameter is propagated to neighbor devices, the result of which is that traffic is shifted away from the network device with the high cost. In other examples, policy information can be modified to make routing to the network device less desirable by neighbor devices. Examples of policy information can include weight parameters, local preference parameters, AS-path parameters, etc. The modification of the routing configuration information can be on a per-interface basis and all of the interfaces can be modified in the same manner so as to reduce a volume of traffic on the network device. Post-checks can be performed in addition to ensure that traffic has fallen below a threshold value.

Figure 9:
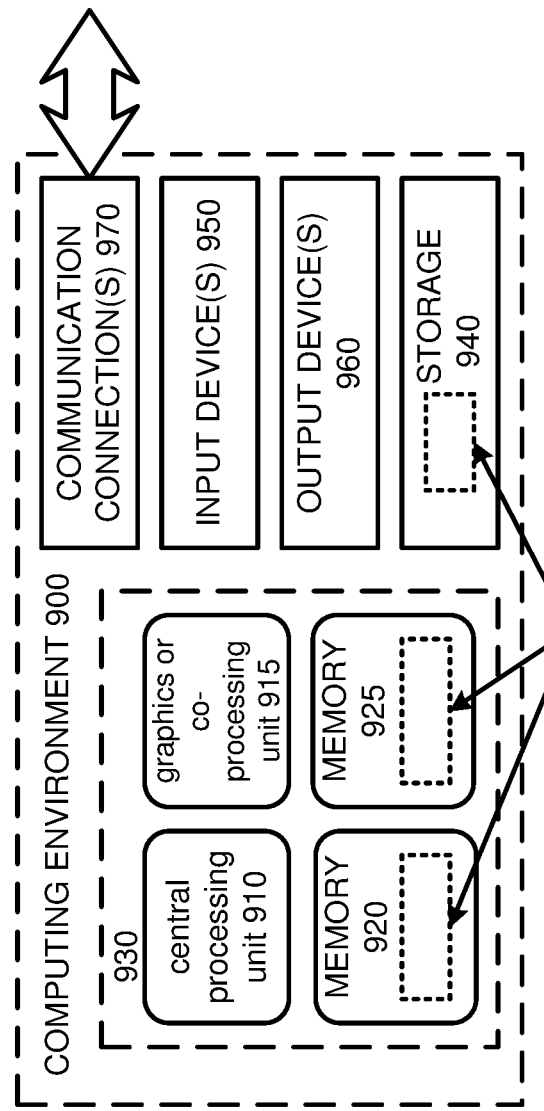
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices and can be used as the traffic shifting service.

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Still further, components described as "coupled" together include components directly connected or indirectly connected, such as when one or more intermediate components are inserted there between.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of shifting traffic away from a network device on a network, the method comprising:
   receiving identification information for the network device;
   performing a discovery phase wherein the network device is queried for network topology information, which identifies neighbor network devices;
   determining whether the network topology information is consistent between the network device and the neighbor network devices by querying the neighbor network devices for additional network topology information and cross-checking that an identification of neighbor network devices are in agreement including cross-checking network interfaces between the network device and the neighbor network devices to ensure that they identify each other as neighbors and if the network interfaces match, then passing a precheck phase, wherein the cross-checking is performed by a server computer separate from the network device and separate from the neighbor network devices;
   determining whether the network has sufficient capacity to route traffic without using the network device;
   determining whether the network device is on a list that identifies different network devices that are not to be removed from the network and passing the precheck phase if the network device is not on the list and failing the precheck phase if the network device is on the list;
   if the precheck phase passed, including the cross-checking of network interfaces, then shifting network traffic away from the network device by changing routing configuration information stored on the network device; and
   after a period of time has passed, checking that the network traffic on the network device has been reduced below a predetermined threshold.

2. The method of claim 1, further including querying the network device and the neighbor network devices for protocol information and cross-checking that the protocol information is consistent.

3. The method of claim 2, wherein determining whether the network topology information are in agreement includes checking that network topology information on the neighbor network devices is not conflicting with the network topology information on the queried network device.

4. The method of claim 1, wherein the changing of the routing configuration information includes changing a cost parameter associated with each interface on the network device or changing routing policy information associated with an external Border Gateway Protocol (BGP) peer or peer groups on the network device.

5. The method of claim 1, wherein the determining whether the network has sufficient capacity includes determining a current volume of network traffic and determining whether alternative network devices and associated links in the network have sufficient bandwidth to handle the current volume of network traffic.

6. A computer-readable storage medium including instructions that upon execution cause a computer system to:
   receive identification information for a network device from which network traffic is to be shifted away, the network device being in a network;
   perform a pre-check wherein a determination is made whether the network device can be removed from the network by querying the network device for first topology information, identifying neighbor network devices using the topology information, querying the neighbor network devices for their topology information, and confirming that the first topology information and the topology information of the neighbor network devices are consistent, wherein the confirming includes cross-checking network interfaces between the network device and the neighbor network devices and passing the pre-check if the network interfaces match, wherein the cross-checking is performed by a server computer separate from the network device and from the neighbor network devices, wherein the pre-check further includes checking a list to ensure the network device is authorized to be removed and failing the pre-check if the network device is on the list; and
   configure the network device by modifying routing configuration information stored in the network device so as to shift traffic away from the network device.

7. The computer-readable storage medium according to claim 6, wherein the confirming includes checking that the network device identifies the neighbor network devices and the neighbor network devices identify the network device.

8. The computer-readable storage medium according to claim 6, wherein the performing the pre-check comprises:
   determining that network capacity is sufficient once the network traffic is shifted away from the network device.

9. The computer-readable storage medium according to claim 6, wherein the performing the pre-checks comprises:
   determining interfaces on the network device that are used to connect to neighbor network devices and that are included in a routing protocol.

10. The computer-readable storage medium according to claim 6, wherein the modifying the routing configuration information includes modifying routing policy or increasing a cost parameter on the network device.

11. The computer-readable storage medium according to claim 6, wherein the instructions, upon execution, further cause the computer system to:
    after the configuring, and after a predetermined period of time, check whether network traffic on the network device has dropped below a threshold level.

12. The computer-readable storage medium according to claim 6, further including instructions that further cause the computer system to:
    query the network device for current cost settings and determine whether cost settings on neighbor devices are equal to the current cost settings.

13. The computer-readable storage medium according to claim 6, wherein receiving of the identification information includes receiving an address of the network device.

14. The computer-readable storage medium according to claim 6, further including instructions that, upon execution, cause the computer system to:
    perform a discovery phase wherein configuration information is obtained from the network device.

15. The computer-readable storage medium according to claim 6, wherein the modifying of the routing configuration information includes changing routing policy information associated with external Border Gateway Protocol (BGP) peer or peer groups on the network device.

16. The computer-readable storage medium according to claim 6, wherein the instructions, upon execution, further cause the computer system to:
after the configuring, and after a predetermined period of time, check protocol status information to ensure that the routing configuration information has been updated.

17. A system, comprising:
a first network device within a data center;
a set of network devices, wherein the first network device and the set of network devices have communication paths there between for establishing a network connection in a network;
a server computer separate from the first network device and from the set of network devices and operable to perform the following:
query the first network device for first neighbor information;
query the set of network devices for second neighbor information;
check, in a first check, that the first neighbor information and second neighbor information are consistent by ensuring that they identify each other as neighbors including cross-checking network interfaces between the first network device and the set of network devices to ensure that they match by identifying one another;
check, in a second check, that the first network device is not on a list of network devices that cannot be removed from the network; and
write routing configuration information to the first network device so as to shift network traffic away from the first network device if the first and second checks passed.

18. The system of claim 17, wherein the routing configuration information includes policy or cost information.

19. The system of claim 17, wherein the server computer is further operable to:
determine whether network capacity is sufficient to sustain network traffic if the first network device is removed from the network.

20. The system of claim 17, wherein the first network device is a router and wherein the server computer is further operable to perform the following:
after the writing of the routing configuration information, and after a predetermined period of time, check network traffic on the network device to ensure that the network traffic has dropped below a threshold level.

* * * * *